(12) United States Patent
Giannetta et al.

(10) Patent No.: US 6,334,881 B1
(45) Date of Patent: Jan. 1, 2002

(54) FILTER MEDIA

(75) Inventors: Richard Giannetta, Elkton, MD (US); Michael Debes, West Grove, PA (US)

(73) Assignee: Gore Enterprise Holdings, Inc., Newark, DE (US)

( * ) Notice: Subject to any disclaimer, the term of this patent is extended or adjusted under 35 U.S.C. 154(b) by 0 days.

(21) Appl. No.: 09/552,921

(22) Filed: Apr. 20, 2000

Related U.S. Application Data

(60) Provisional application No. 60/130,128, filed on Apr. 20, 1999.

(51) Int. Cl.$^7$ .............................. B01D 29/05; B01D 46/10
(52) U.S. Cl. ................................ 55/486; 55/498; 55/502; 55/524; 55/528
(58) Field of Search ............................ 55/486, 498, 499, 55/502, 524, 528

(56) References Cited

U.S. PATENT DOCUMENTS

| | | | |
|---|---|---|---|
| 3,953,566 A | | 4/1976 | Gore .............................. 264/288 |
| 4,110,392 A | | 8/1978 | Yamazaki ..................... 264/127 |
| 4,187,390 A | | 2/1980 | Gore .......................... 174/102 R |
| 4,188,197 A | | 2/1980 | Amberkar et al. ............. 55/382 |
| 4,478,620 A | * | 10/1984 | Tamura ........................... 55/486 |
| 4,699,637 A | * | 10/1987 | Iniotakis et al. ........... 55/524 X |
| 4,816,328 A | * | 3/1989 | Saville et al. ............... 55/486 X |
| 4,877,433 A | * | 10/1989 | Oshitari ........................... 55/486 |
| 4,878,930 A | | 11/1989 | Manniso et al. ................ 55/493 |
| 4,983,434 A | * | 1/1991 | Sassa ........................... 55/486 X |
| 5,019,140 A | * | 5/1991 | Bowser et al. ............. 55/486 X |
| 5,096,473 A | * | 3/1992 | Sassa et al. ................. 55/486 X |
| 5,104,727 A | | 4/1992 | Wnenchak .................... 428/285 |
| 5,108,474 A | * | 4/1992 | Riedy et al. ................. 55/486 X |
| 5,207,812 A | * | 5/1993 | Tronto et al. ................... 55/498 |
| 5,350,515 A | * | 9/1994 | Stark et al. ................. 55/498 X |
| 5,478,372 A | * | 12/1995 | Stark ........................... 55/524 X |
| 5,507,847 A | * | 4/1996 | George et al. .................. 55/486 |
| 5,527,569 A | | 6/1996 | Hobson et al. .............. 428/35.2 |
| 5,762,796 A | * | 6/1998 | Zraik ............................. 55/498 |
| 5,776,343 A | * | 7/1998 | Cullen et al. .............. 55/524 X |
| 5,858,045 A | * | 1/1999 | Stemmer et al. ............... 55/486 |
| 5,904,846 A | * | 5/1999 | Clements et al. .......... 55/498 X |
| 5,928,414 A | * | 7/1999 | Wnenchak et al. ........ 55/528 X |
| 6,030,428 A | * | 2/2000 | Ishino et al. ................... 55/486 |
| 6,110,243 A | * | 8/2000 | Wnenchak et al. ........ 55/528 X |
| 6,149,702 A | * | 11/2000 | Kawano et al. ............ 55/528 X |
| 6,214,093 B1 | * | 4/2001 | Nabata et al. .............. 55/486 X |

FOREIGN PATENT DOCUMENTS

| | | |
|---|---|---|
| EP | 0 217 482 A1 | 4/1987 |
| EP | 0 246 917 A2 | 11/1987 |

OTHER PUBLICATIONS

International Search Report for PCT/US00/10638 (2 pages).
Poon, W. S. "Seasoning Test Method for Cleanable Filter Media", AFSS Conference, Apr. 1999, Boston, MA.

* cited by examiner

Primary Examiner—Robert H. Spitzer
(74) Attorney, Agent, or Firm—Carol A. Lewis White

(57) ABSTRACT

The present invention is an improved material which may be used as a filter media for gas filtration systems, such as for industrial gas streams and commercial or residential vacuum cleaners. The filter material comprises a filter media support bonded to a porous expanded PTFE membrane, and further comprising a screen material bonded to the porous expanded PTFE. The screen material protects the expanded PTFE surface against damage due to impingement of particles during operation of the gas filtration system.

47 Claims, 6 Drawing Sheets

FILTER MEDIA

RELATED APPLICATIONS

The present application is a regular application based on co-pending United States Provisional Patent Application No. 60/130,128 filed Apr. 20, 1999.

FIELD OF THE INVENTION

This invention relates to layered materials incorporating expanded PTFE membrane which are useful as filter media for filtering solids from fluid streams, such as, for example, industrial gas streams, commercial and residential vacuum cleaner dust streams, and the like.

BACKGROUND OF THE INVENTION

The removal of particulates from a gas stream has long been a practice in a variety of industrial and consumer fields. Conventional means for filtering particulates and the like from gas streams include, but are not limited to, filter bags, filter tubes and filter cartridges. For convenience herein, the term "filter element" will be used to refer collectively to these types of filtration means.

Conventional filtration techniques utilize the filter media to stop particles through the depth of the element, and as the particles build up in and/or on the element, the filtration efficiency of the element is increased. After an amount of dust has caked on the surface of the filter element, the flow rate of gas through the element is reduced to a level where the bulk dust cake must be removed from the element, typically by some form of agitation, such as vibration or the like.

Conventional filter elements are typically constructed from felt and/or fabric media made from a variety of materials, including polyesters, polypropylenes, aramids, glasses and fluoropolymers. Selection of the type of media used is typically based on the gas stream with which the filter element comes in contact, the operating conditions of the system and the type of particulates being filtered.

A significant development in the area of particle filtration was achieved when expanded PTFE membrane was incorporated as a surface laminate on conventional filter elements. One example is taught in U.S. Pat. No. 4,878,930, directed to a filter cartridge for removing particles of dust from a stream of moving gas or air. Preferred filter media for the cartridge are felt or fabric composites containing a layer of porous expanded polytetrafluoroethylene membrane.

Use of the expanded PTFE membrane greatly enhanced the performance of filter elements because the particles collected on the surface of the expanded PTFE, rather than in the depth of the elements as was occurring in the absence of the expanded PTFE layer. Several significant advantages were observed with these filter elements. First, the filtration efficiency of the elements was high immediately from the outset of the filtration process, and it was not necessary to "build up" a cake of particles to achieve high efficiency. Second, the elements lasted longer because particles were not getting into the backing fabric of the element and rubbing on the fibers to wear them out. Third, for cleanable systems, the cleaning energy needed to clean the particle cakes off of the elements was lower because the surface of the membrane was smooth and had a lower surface energy.

A variety of vacuum cleaners are presently available that can effectively pick up dry material alone, or both dry and wet materials. These devices are found in a variety of forms, but all generally comprise a large holding tank with a suction unit mounted on the tank. Dry and/or wet materials are drawn through a hose into the holding tank during suction.

In the case of dry material pick-up, it is important that dust drawn into the tank of a vacuum cleaner is not blown into the air outside the tank through the vacuum exhaust. In order to avoid this situation, all of these vacuums are sold with some form of filter mounted between the tank and the exhaust to contain dry dust contamination within the vacuum's tank. In the case of wet/dry vacuum cleaners (referred to for convenience as "wet/dry vacs"), one common complaint of users is that the filters are not suitable for use with wet materials. When the typical wet/dry vac filters are exposed to water or even wet materials (e.g., wet leaves), the water tends to wet-out the paper filters and quickly destroys them under the harsh conditions of vacuuming. Many of these problems have been overcome by the use of wet/dry vac filters employing a hydrophobic and air permeable filter material, such as an expanded polytetrafluoroethylene (PTFE). These improved wet/dry vac filter cartridges are available from W. L. Gore and Associates, Inc., sold under the trademark CLEANSTREAM®. These filters upon installation have been demonstrated to provide a filtration efficiency of 60 to 99%, or more, for 0.3 micron particles, and preferably an efficiency of 99.7 to 99.97 or more.

Over time, particle impingement, whether on membrane or non-membrane filter media can severely affect filter performance. Direct particle impingement and dust impaction has common effects on most porous air filter media regardless of material or construction. For example, whether the filter media comprises spunbond or meltblown polyester, polypropylene, polyethylene, fiberglass, microfiberglass, or ePTFE membrane, particle impingement can result in reduced permeability due to dust impregnation (both short term and permanent), accelerated degradation of the filter media characterized by fraying, efficiency loss or puncture and reduced cleanability as a result of permanent dust impregnation. Moreover, particularly for such high efficiency filter media as ePTFE membrane and microfiberglass, these media are subject to further special problems in that they are particularly susceptible to damage as a result of particle impingement. These ePTFE membranes are designed to provide exceptionally high air filtration efficiencies, but are relatively less abrasion resistant than other lower efficiency media. Therefore the intended function can be seriously compromised by efficiency degradation caused by particle impact abrasion. Even a small amount of media damage can cause the filter to operate below required performance levels, necessitating filter replacement, which is both expensive and time consuming.

The layered materials of this invention are designed to solve these problems.

SUMMARY OF THE INVENTION

The present invention is an improved layered structure suitable as a filter media for gas filtration systems, such as for industrial gas streams and commercial or residential vacuum cleaners. The improved media comprises a support layer such as a non-woven polyester, polypropylene, polyethylene, fiberglass or microfiberglass, bonded to one side of a porous expanded PTFE membrane and a protective surface pattern bonded to the other side of the expanded PTFE membrane. The protective surface pattern protects the expanded PTFE against damage due to impingement of collected particles during operation of the gas filtration system. Thus, the novel filter media is capable of withstanding abrasion induced degradation, while maintaining good filtration efficiency during use. Accordingly, enhanced durability of the filter media is achieved without compromising cleanability.

In a preferred embodiment, the filter media comprises a support layer bonded to a porous expanded PTFE membrane, and further comprises a protective surface pattern comprising a screen material, as described in more detail herein, bonded by lamination to the porous expanded PTFE.

DETAILED DESCRIPTION OF THE INVENTION

Figure 1:
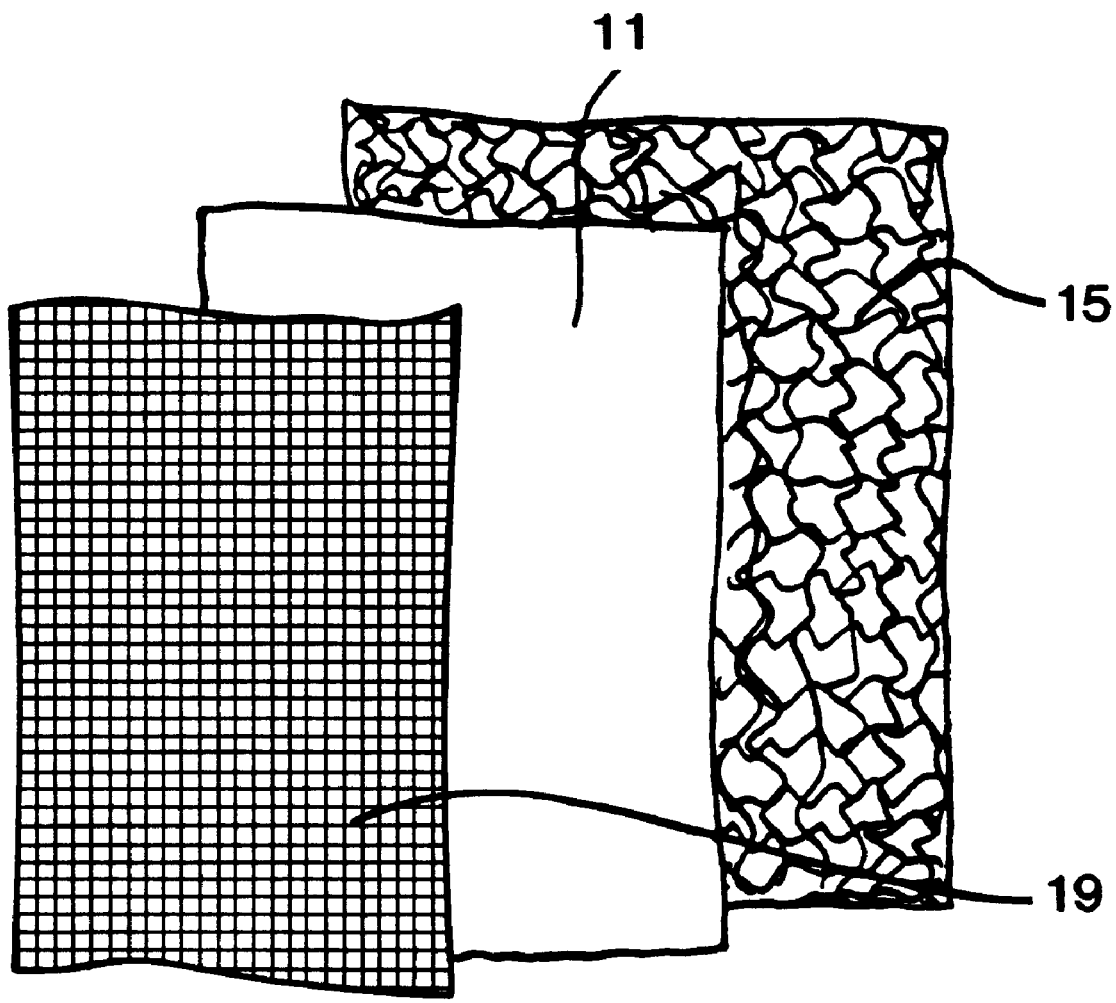
FIG. 1 depicts a preferred layered structure of the invention in an exploded perspective view.

FIG. 1 is a schematic exploded perspective view of a preferred layered structure of the present invention, comprising an expanded PTFE membrane 11 between a nonwoven support layer 15 and a screen material 19. The expanded PTFE membrane is bonded to the nonwoven support layer and to the screen material, such as by lamination.

This invention employs porous expanded polytetrafluoroethylene (PTFE) membranes in its elements. The porous PTFE membranes useful in such elements are prepared by a number of different known processes, but are preferably prepared by expanding PTFE as described in U.S. Pat. Nos. 4,187,390, 4,110,392 and 3,953,566, to obtain expanded, porous PTFE. By "porous" is meant that the membrane has an air permeability of at least 2 cubic feet per minute per square foot (cfm/ft$^2$) at 0.5 inch water gauge (this unit is sometimes referred to as the Frazier number). Membranes having an air permeability of up to 300 cfm/ft$^2$ or more can also be used. The pores are micropores formed by the nodes and fibrils of the expanded PTFE. Preferred membranes of the present invention have an air permeability of at least 5, and more preferably at least 16, cfm/ft$^2$ at 0.5 inch water gauge, for use in gas stream filtration.

The support layer may comprise a nonwoven or felt textile. Examples of suitable support layer materials may include, but are not limited to, spunbond or melt blown polyester, polypropylene, polyethylene, fiberglass, microfiberglass and polytetrafluoroethylene.

The protective surface pattern of the present invention comprises a layer of material, whether continuous or discontinuous, which is oriented on the upstream side of the filter media relative to the direction of air flow and which protects the expanded PTFE against damage due to impingement of collected particles during operation of the gas filtration system. The protective surface pattern may be discontinuous such as a pattern of dots or the like, continuous such as a screen pattern or the like, or some combination of continuous and discontinuous components. Preferably, the protective surface pattern covers 60% or less, and more preferably 50% or less, of the surface area of the membrane when the protective surface pattern is bonded thereto, such as by lamination, screen printing, gravure printing, or the like. Coverage of the surface area of the membrane by the protective surface pattern was determined by examination under a digital video camera (Sony CCD-IRIS) positioned at a 90 degree angle to the plane of the sample surface and at 10×magnification. The image was captured by a digital image capturing board (sold under the model name "Snappy" by Play, Inc., U.K.) at a resolution of 1024×768 pixels and transferred to a computer. The digital image was analyzed with Scion Image Software (Scion Corporation, Frederick, Md.) to determine the coverage. The image was processed into a black and white picture which showed the open area as white, and covered area as black. The percent coverage was the number of black pixels divided by the total number of pixels (total of 1024×768).

In a preferred embodiment, the protective surface pattern comprises a screen pattern of a substantially uniform arrangement of intersecting filaments, whether the filaments are oriented perpendicular to one another or at some other angle relative to the machine direction (i.e., the direction of material travel during manufacture) of the material. As used herein, the term "filament" is intended to refer to either a single thread, fiber or strand, or a multi-strand structure such as, for example, a monolithic extrusion, a wire, or a spun fiber. The term "substantially uniform" is intended to refer to a regularly repeating pattern, presenting an unvaried appearance. Intersecting refers to the filaments touching one another at spaced intervals. In one embodiment, the filament surfaces on at least the side of the screen which is bonded to the ePTFE membrane are substantially planar, or flat, such as would be the case with a screen formed by expanding a thermoplastic polymer extrusion. Alternatively, the screen may be multi-planar (e.g., formed by heat-welding at intersections, such as woven, knitted, knotted, etc.). Preferred screen materials are those which have openings between the filaments such that 60% or less, and preferably 50% or less, of the surface area of the membrane is covered by the screen when the screen is bonded thereto such as by lamination. Moreover, preferred screen materials have a thickness of at least 3 mils, and more preferably at least 6.5 mils. Suitable screens may include, but are not limited to, plastics such as polypropylene and polyethylene, polyurethane, nylon, metals such as stainless steel and aluminum, and fiberglass. A particularly preferred screen comprises a polypropylene screen layer of 8.0 mils thickness with machine direction filament counts of 22 per inch and cross-web direction (i.e., perpendicular to the machine direction) filament counts of 12 per inch.

One or more adhesives may optionally be used to bond the layers together, depending on the desired construction of the filter media and the compositions of the support material and screen. One suitable adhesive is a thermoplastic adhesive, which can be softened upon heating, then hardened upon cooling over a number of heating and cooling cycles. An example of such a thermoplastic adhesive would be a "hot melt" adhesive.

In a preferred embodiment, the ePTFE membrane is bonded to the support material, for example, using a suitable lamination technique, such as passing the materials through a hot roll nip at a temperature sufficient to melt a surface of the support material and adhere the backer to a membrane. The screen is then bonded to the exposed expanded PTFE surface using an adhesive to adhere screen to the membrane.

The novel filter media of the present invention has an air permeability of at least 1 Frazier, preferably at least 2

Frazier, more preferably at least 4 Frazier, and more preferably at least 7 Frazier.

In use, the filter media of the present invention is oriented so that the protective surface pattern is located upstream of the expanded PTFE layer so that it protects the expanded PTFE against damage due to impingement of collected particles during operation of the gas filtration system. Thus, the novel filter media is capable of withstanding abrasion induced degradation, while maintaining good filtration efficiency during use. Accordingly, it was surprisingly found that enhanced durability was achieved with the present filter media without compromising cleanability.

As used herein, the terms "durable" and "durability" refer to the filter media's ability to resist damage and to protect the physical integrity of the membrane (i.e., prevent or minimize tears, cracks, holes, etc.). Durability can be evaluated by measuring the particle collection efficiency retention of the filter media, which is a measure of particle collection efficiency (see test methods below, e.g., 0.3 micron particle size challenge, face velocity of 5.3 cm/sec) of an abraded filter media sample (e.g., 50 cycles with 240 grit sandpaper) relative to the efficiency of the same sample in an unabraded state. The preferred particle collection efficiency retention for the filter media of the present invention is at least 80%. Cleanability is the ability to remove collected particulate from the media and can be determined by measuring the recovery of air permeability of the sample after cleaning (see test methods below). Preferred air permeability recovery of the novel filter elements of the present invention is at least 50%, more preferably at least 70%.

TEST METHODS
AIR PERMEABILITY—FLAT SHEETS

The air permeability of the expanded PTFE membranes and the filter media in flat sheet form were measured using the procedure described herein.

Air permeability was measured by clamping a test sample in a gasketed flanged fixture which provided a circular area of approximately 3827 mm$^2$ (69.85 mm diameter) (6 square inches (2.75 inches diameter)) for air flow measurement. The upstream side of the sample fixture was connected to a flow meter in line with a source of dry compressed air. The downstream side of the sample fixture was open to the atmosphere. Testing was accomplished by applying a pressure of 12.7 mm (0.5 inch) of water to the upstream side of the sample and recording the flow rate of the air passing through the in-line flowmeter (a ball-float rotameter). The sample was conditioned at 70° F. and 65% relative humidity for at least 4 hours prior to testing. Results were reported in terms of Frazier Number, which is the volume of air flow in cubic feet/minute/square foot of sample at 12.7 mm (0.5 inch) water gauge.

STRENGTH—BALL BURST

This test method and the related sample mounting apparatus were developed by W. L. Gore & Associates, Inc. for use with a Chatillon Test Stand. The test is a mechanical measurement of the burst strength of materials such as fabrics (woven, knit, nonwoven, etc.), porous or nonporous plastic films, membranes, sheets, etc., laminates thereof, and other materials in planar form.

A specimen is mounted taut, but unstretched, between two annular clamping plates (inside unsupported diameter—3 inches). A metal rod having a polished steel 1" diameter ball-shaped tip applies a load against the center of the specimen in the Z-direction (normal to the X-Y planar directions). The rod is connected at its other end to an appropriate Chatillon force gauge mounted in a Chatillon Materials Test Stand, Model No.TCD-200 (Ametek Test & Calibration Instruments, Largo, Fla.). The load is applied at the rate of 10 inches per minute until failure of the specimen occurs. The failure (tearing, burst, etc.) may occur anywhere within the clamped area. Results are reported as the maximum applied force before failure.

Testing is done at ambient interior temperature and humidity conditions, generally at a temperature of 70–72° F. and relative humidity of 45–55%. Materials to be tested are not conditioned at specific temperature and humidity conditions prior to testing. Measurements are reported in pounds/inch$^2$ (psi).

AIR FLOW—PLEATED ELEMENTS

The flow of air through the pleated filter elements was measured using the procedure described below.

The air flow through the filter elements was measured per ASTM procedure F 558-93. Particularly, this test method covers procedures for determining air performance characteristics of household, upright, canister, and combination-type vacuum cleaners having provisions for attaching a hose. A ROYAL(®) DIRT DEVIL® "VISION" vacuum cleaner (Model No. 086900, Royal Appliance Manufacturing, Inc., Cleveland, Ohio, having a 120 V, 60 Hz motor from GS Electric (A712-3410-65)) hose was connected to a plenum chamber which could be fitted with orifice plates providing an opening ranging from 0.250 inch to 2.00 inch. The vacuum cleaner was then fitted with a clean filter. The cleaner was turned on, and a manometer attached to the plenum chamber was used to measure resulting suction in inches of water. This "measured" suction, along with ambient room temperature, humidity and barometric pressure, were used to calculate the "corrected suction" and air flow in cubic feet per minute. (Reference ASTM F 558-93 available from the American Society For Testing & Materials.)

ABRASION TEST—UNIVERSAL WEAR TEST

The flat samples of filter media were abraded using the test described below. Abrasion testing was performed on a CSI-Stoll Quartermaster Wear Tester, Model No. CS-22C, from Custom Scientific Instruments (Cedar Knolls, N.J.). For testing, a sample of filter media measuring 6 inches (152.4 mm) in diameter was secured to the sample holder of the tester by sliding a rubber o-ring over the sample and re-installing the sample holder in the tester. The size of the sample was chosen so that it would fit into the particle collection efficiency tester (described below) for subsequent testing. The actual area on the sample to be abraded was about 2 inches diameter circle in the center of the test sample. The abrasive material used for testing (specified in the examples) was installed in the abrasion tester by clamping to the friction pad. A two pound weight was then applied to the lever arm of the friction pad and the number of cycles was programmed into the cycle timer. The lever arm was then lowered to contact the abrasive material with the sample, and the test was begun, whereby the sample holder moved back and forth against the abrasive material while it simultaneously indexed in a circular motion. Each sample was tested for the number of preset abrasion cycles.

PARTICLE COLLECTION EFFICIENCY TEST

Particle collection efficiency was measured by an automated tester (Model 8160 from TSI, Inc., St. Paul, Minn.). A 6 inch (152.4 mm) diameter flat sheet sample of the filter media was enclosed in the filter holder with gasket seals mounted horizontally. The circular filter holder had two zones, a center test zone which allows air flow and test particles to pass through and an outer guard zone to prevent leakage of air flow between the test zone and the atmosphere. The differential pressure between the two zones was adjusted to near zero so that no outside air leaks into the test zone. The test zone had an area of approximately 100 cm² (11.3 cm diameter) (15 square inch (4.4 inch diameter)). A dioctyl pthalate (DOP) solution was atomized to generate a polydisperse aerosol. The aerosol particles were then classified according to their electrical mobilities to generate monodisperse particles from 0.03 to 0.5 micrometer in diameter. The particles were then passed to the test filter. Two condensation nucleus particle counters simultaneously measured the particle concentrations upstream and downstream of the filter to determine the particle collection efficiency. The efficiency was reported as the percentage of particles collected by the filter relative to the upstream challenge particles. The pressure drop was recorded in mm of water gauge. The test was performed at a media face velocity of 5.3 cm/sec.

When the particle collection efficiency of the non-abraded section of each sample was greater than 99%, particles which penetrated the media samples during the efficiency test were assumed to pass through the abraded sections of the samples.

The test was performed at ambient room temperature (70° F.) and humidity conditions (40%). Samples to be tested were not conditioned at specific temperature and humidity conditions prior to testing.

PERMEABILITY RECOVERY

The permeability recovery of a pleated filter element is determined using the test method described below (See Poon, W. S. "Seasoning test method for cleanable filter media", presented at 12$^{th}$ Annual Technical Conference of the American Filtration & Separation Society, Apr. 6–9, 1999, Boston, Mass.").

The filter media was tested in a test chamber having attached thereto a fluidized bed dust generator and pulse-cleaning system. The test chamber measured 4 inch by 18 inch by 10 inch (width×height×depth) and the filter sample (4 inch by 18 inch, area 0.5 ft²) was mounted vertically. The face velocity and air flow rate were 20 ft/min and 10 ft³/min, respectively. The fluidized bed dust generator had a container for the dust and a nozzle underneath and was used to disperse the test dust to be collected by the filter. The high velocity air jet from the nozzle sheared the dust particles, then broke up and dispersed the dust particles. The flow rate of the fluidized bed was 1.5 ft³/min. Cement dust (Portland Cement type I, 2 to 34 microns diameter, Lehigh Portland Cement Co., Allentown, Pa.) was used, and 420 g was put in the container. The pulse-clean system consisted of a diaphragm valve connected to a compressed-air tank. The tank pressure was set at 30 psi. When the valve opened, the compressed air burst into the clean side of the test chamber, i.e., downstream side of the test filter. The short pulse (50 milliseconds) of air knocked the dust off the filter surface by imparting movement and reversing the air flow momentarily.

During a test cycle, the filter was loaded with the cement dust until the pressure drop reached 8 inches of water. Cleaning was then triggered and the diaphram valve was opened to release the compressed air. Immediately after cleaning was completed, the pressure drop of the filter was recorded. This is called the residual pressure drop. After the filter was cleaned, loading began again. The loading and cleaning cycles were repeated 15 times. The air permeability of the filter after cleaning was calculated from the face velocity and the residual pressure drop for each cycle. The tests were repeated three times each for the media with and without the netting material.

Generally, the pressure drop across the filter media is linearly proportional to the face velocity of the air flow. At 20 ft/min, the permeability of the sample is related to the residual pressure drop by the following equation:

$$\text{Permeability, Frazier} = 10/\text{Residual Pressure, inch of water}$$

The permeability recovery is the ratio of the permeability to the initial permeability. That is, $$\text{Permeability Recovery, \%} = (\text{Permeability}/\text{Initial Permeability}) \times 100$$

COMPARATIVE EXAMPLE

A filter cartridge was constructed by first obtaining an expanded porous polytetrafluoroethylene (ePTFE) membrane having an average Frazier number of 19.7 and a ball burst measurement of 3.87 psi (available from W. L. Gore and Associates, Inc.). The membrane was then laminated to a 200 g/m² polyester non-woven backing material, measuring about ½ mm thick (available from Kolon Industries, Inc., Korea). Lamination was carried out by passing the support material and the membrane through the nip of a heated roller at a temperature of 325° C. at a speed and pressure sufficient to adhere the nonwoven backing material to the membrane/ of 150 feet per minute with 30 psi of pressure.

The laminate was slit to a width of 8.5 inches and cut lengthwise to provide 55 pleats (4.2 pleats per inch) (3.2 ft²), which were then formed into a cylindrical shape, and the two end pleats were glued together with a bead of ethylene vinyl acetate (EVA) hot melt adhesive (The Dexter Corporation Seabrook, N.H.) placed along the edges of the media to be joined.

A filter support tube was constructed by cutting a 2.94 inch diameter cylinder of formed thermoplastic tubing (available from NSW Corporation, Roanoke, Va., part number FT2A45) to a length of 8.5 inches.

The filter cartridge was assembled by sliding the formed thermoplastic tube into the center of the cylindrical pleated filter media. This construction was then potted into machined polycarbonate end caps (polycarbonate, available from AIN Plastics of Harrisburg, Pa.) having a radial groove with an outside diameter of 4.12 inches and an inside diameter of 2.61 inches, and measuring 0.200 inch deep. The top cap had a central opening of 2.61 inches in diameter, and the bottom cap was solid with no opening. The potting material used to adhere the pleated filter media and filter support tube to the end caps was a room temperature curable urethane (GORE-BOND™ 13P3 adhesive, W.L. Gore & Associates, Inc., Elkton, Md.).

Example 1

A filter cartridge was constructed by first obtaining an expanded porous polytetrafluoroethylene (ePTFE) membrane having an average Frazier number of 19.7 and a ball burst measurement of 3.868 psi (available from W. L. Gore and Associates, Inc., Elkton, Md.). The membrane was then laminated to a 200 g/m² polyester non-woven backing material, measuring about ½ mm thick (available from Kolon Industries, Inc., Korea). Lamination was carried out by passing the support material and the membrane through the nip of a heated roller at a temperature of 325° C. at a speed of 150 feet per minute with 30 psi of pressure.

A polypropylene screen layer of 8.0 mils thickness with machine direction filament counts of 22 per inch and cross web direction filament counts of 12 per inch (available from Applied Extrusion Technologies, Inc. Middletown, Del. as RB0404-12P with an adhesive on the planar, or flat, side of the screen) was laminated to the membrane side of the ePTFE/non-woven polyester structure. The lamination was carried out during a pleating process carried out on a servo controlled blade pleater, during which 0.5 inch pleats were formed in the laminate. The materials were passed between a heated platen (heated to 280° F.) and a 2 inch diameter aluminum roller which ran the width of the materials (on top) to ensure good contact of the softened adhesive with the ePTFE, then through a post pleating platen set to 300° F.

The membrane laminate was slit to a width of 8.5 inches and cut lengthwise to provide 55 pleats (4.2 pleats per inch) (3.2 ft$^2$), which were then formed into a cylindrical shape, and the two end pleats were glued together with a bead of ethylene vinyl acetate (EVA) hot melt adhesive (The Dexter Corporation Seabrook, N.H.) placed along the edges of the media to be joined.

A filter support tube was constructed by cutting a 2.94 inch diameter cylinder of formed thermoplastic tubing (available from NSW Corporation, Roanoke, Va., part number FT2A45) to a length of 8.5 inches.

The filter cartridge was assembled by sliding the formed thermoplastic tube into the center of the cylindrical pleated filter media. This construction was then potted into machined polycarbonate end caps (polycarbonate, available from AIN Plastics of Harrisburg, Pa.) having a radial groove with an outside diameter of 4.12 inches and an inside diameter of 2.61 inches, and measuring 0.200 inch deep. The top cap had a central opening of 2.61 inches in diameter, and the bottom cap was solid with no opening. The potting material used to adhere the pleated filter media and filter support tube to the end caps was a room temperature curable urethane (GORE BOND I3P3 adhesive, available from W. L. Gore & Associates, Inc., Elkton, Md.).

The air flow of the resulting pleated filter element was measured to be 62.60 cfm with corrected suction of 1.40 H$_2$O @ at an orifice opening of 2 inches.

VACUUM CLEANER ABRASION TESTING CONDITIONS

The filter of the Comparative Example and of Example 1 were each installed in an upright vacuum cleaner (ROYAL® DIRT DEVIL® "VISION" vacuum cleaner (Model No. 086900, Royal Appliance Manufacturing, Inc., Cleveland, Ohio, having a 120 V, 60 Hz motor from GS Electric (A712-3410-65)). Approximately 1.5 cups of sand (available as "All Purpose Sand" from American Stone-Mix Inc. Towson, Md.) was added to the vacuum cleaner dust cup. The vacuum was cycled on for eight minutes and off for two minutes to create a cyclonic flow of the sand around the filter element.

For the filter of the Comparative Example, after 2 hours of the on-and-off cycling, the filter was removed and visually inspected. Significant damage to the media was observed based on the shredded appearance of the membrane surface.

For the filter of Example 1, after 140 hours of the on-and-off cycling, the filter was removed and visually inspected. Minimal abrasion of the membrane was observed.

Figure 5:
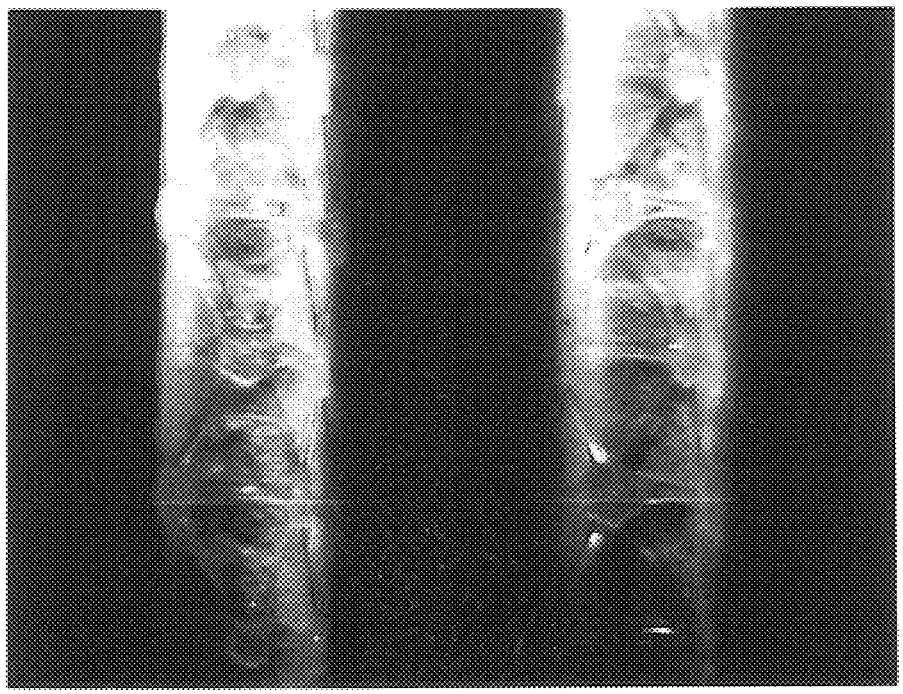
FIGS. 5 and 6 are photographs of pleated filter elements made from the Comparative Example and Example 1, respectively, after abrasion.
Figure 6:
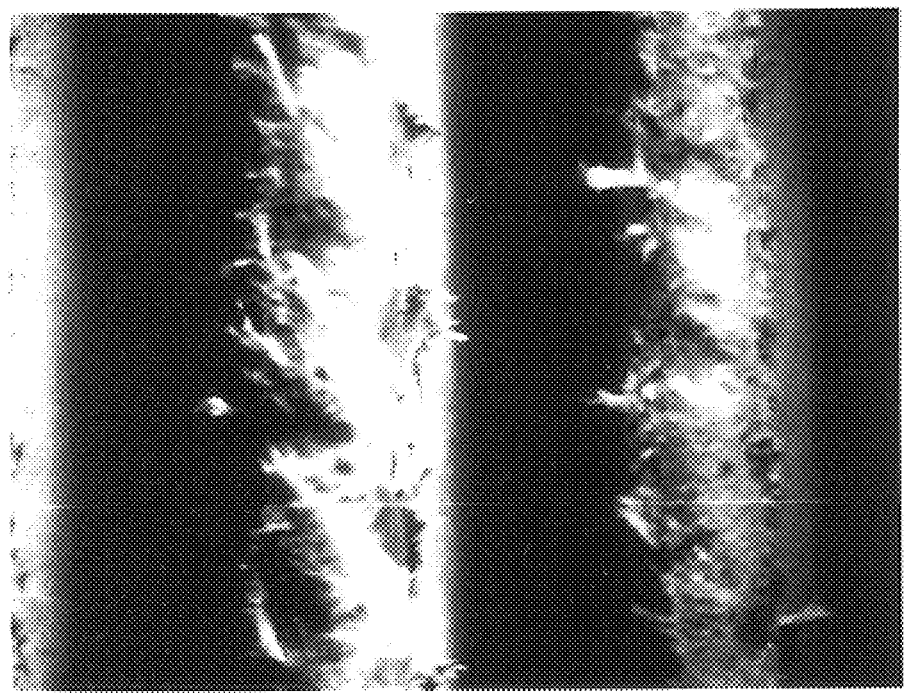

FIGS. 5 and 6 are photographs at 10× magnification showing the Comparative Example filter cartridge and the Example 1 filter cartridge, respectively, after abrasion testing.

Example 2

The procedure of Example 1 was repeated, with the exception that the protective surface pattern layer comprised a polyethylene screen having a thickness of 6.5 mils and a machine direction filament count of 10 per inch and a cross-web direction filament count of 7 per inch (Applied Extrusion Technologies, Inc., Middletown, Del., Part No. KX225NAT-S with a lower melting point thermoplastic adhesive on the planar, or flat, side of the screen).

Filter media samples of Example 2 and samples comprising the unpleated media described in the Comparative Example (i.e., no screen) were then tested for particle collection efficiency after exposure to several different abrasion conditions. Particularly, samples were abraded (see Universal Wear Test) with emery cloth, 240 grit sandpaper and 80 grit sandpaper (all from 3M, Minneapolis, Minn.) for each of 10, 25, 50, 75, 100 and 200 abrasion cycles (a control of 0 cycles was maintained as well). Particle Collection Efficiency was then tested on the abraded samples and the control (no abrasion) using the Particle Collection Efficiency Test.

Figure 2:
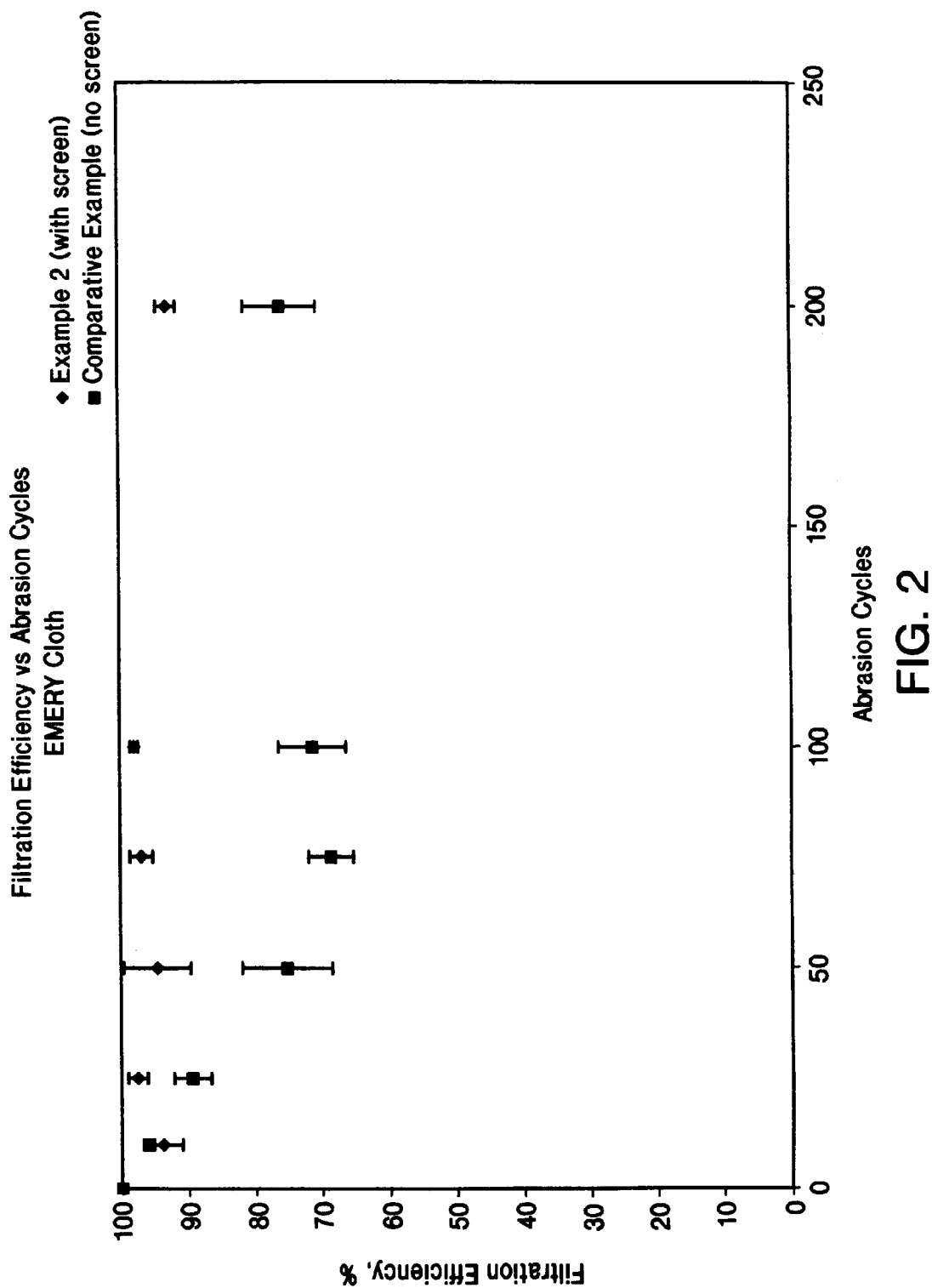
FIGS. 2–4 are graphs showing particle collection efficiency of the filter media of Example 2 and of the Comparative Example after the specified number of abrasion cycles.
Figure 3:
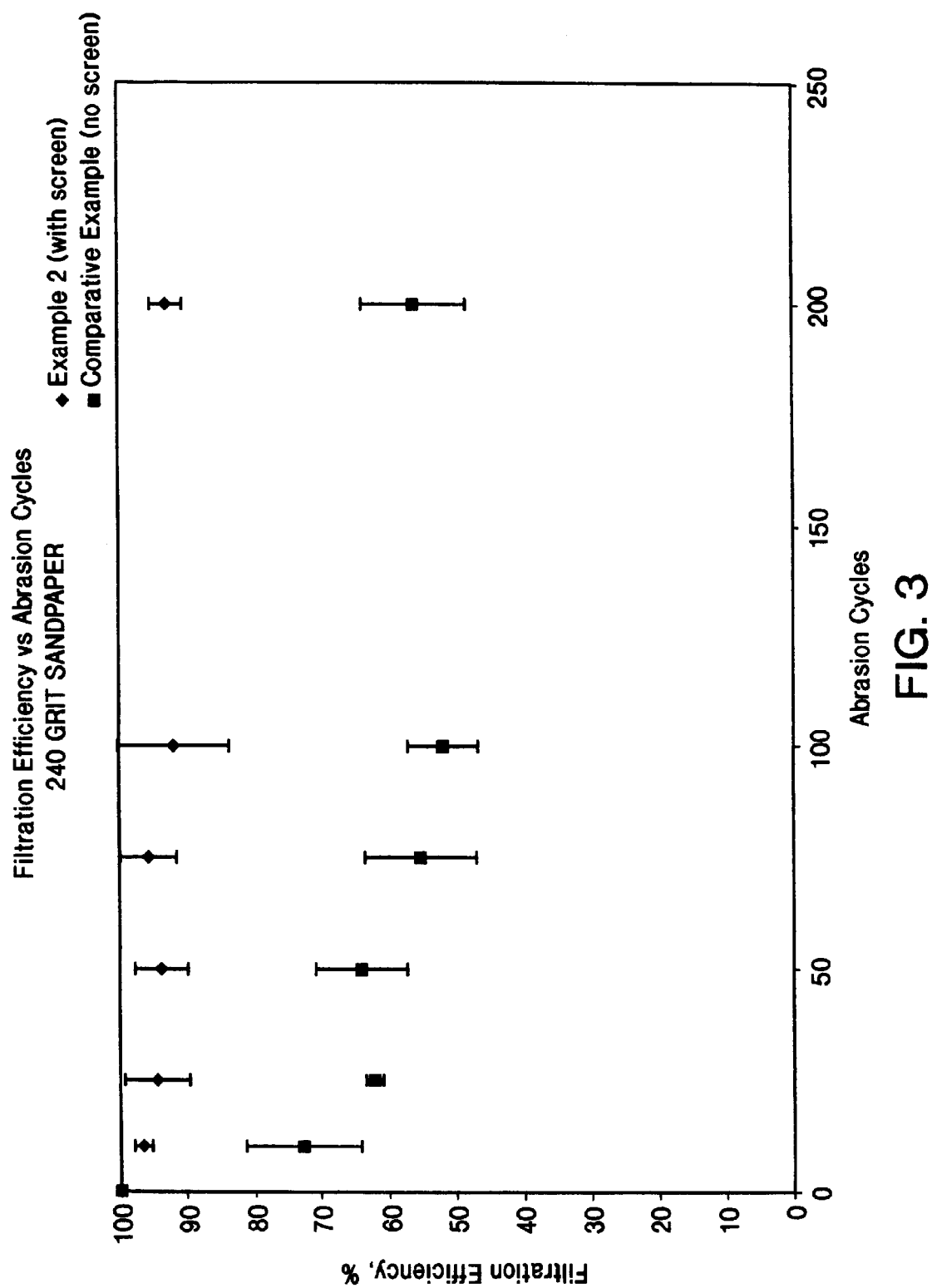
Figure 4:
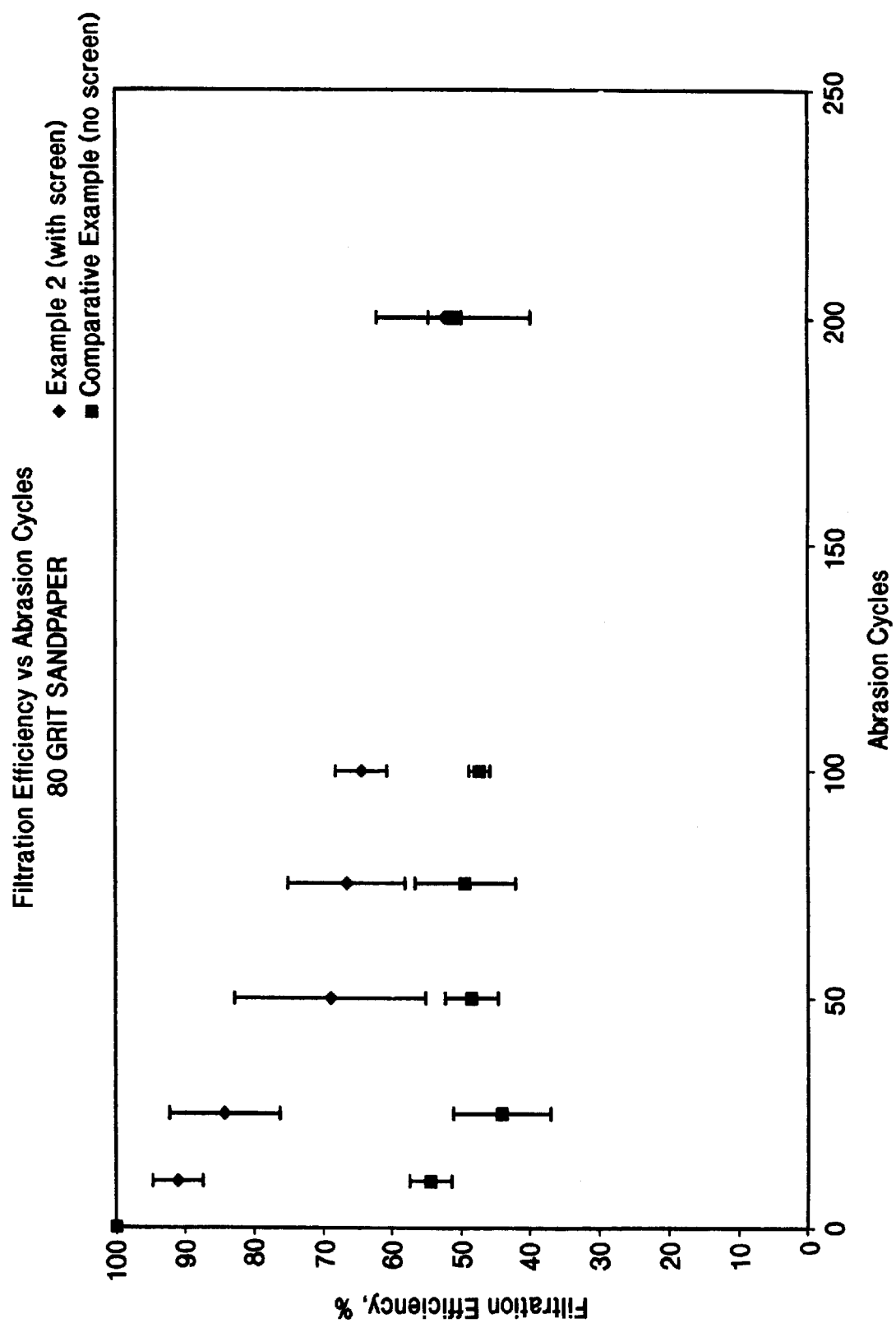

Three samples of each filter media were tested for each abrasive challenge media used. The three samples subjected to each abrasion challenge were then tested for particle collection efficiency. The test results, reported as average efficiency ±1 standard deviation, are reported in the graphs contained in FIGS. 2–4.

Figure 7:
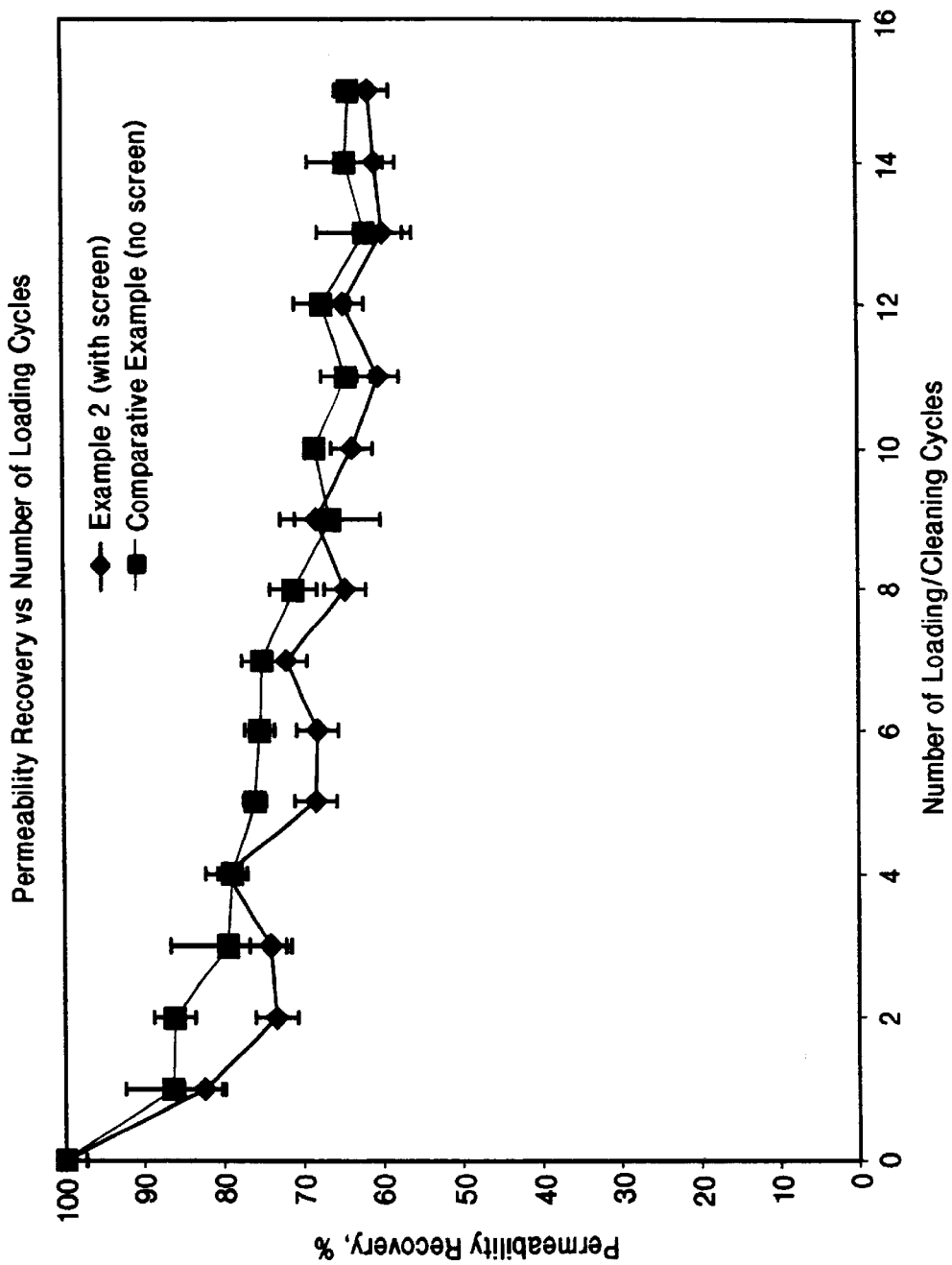
FIG. 7 is a graph showing permeability recovery of the filter media of Example 2 and of the Comparative Example after the specified number of cleaning cycles.

A further sample of the filter media of Example 2 was tested for cleanability as described earlier by testing the Permeability Recovery of the media. Results of the Permeability Recovery testing are reported in the graph of FIG. 7.

Without intending to limit the scope of the present invention, the foregoing examples illustrate how the present invention may be made and used.

While particular embodiments of the present invention have been illustrated and described herein, the present invention should not be limited to such illustrations and descriptions. It should be apparent that changes and modifications may be incorporated and embodied as part of the present invention within the scope of the following claims.

We claim:

1. A filter media comprising:
   (a) a non-woven support layer;
   (b) an expanded porous PTFE membrane layer bonded to the non-woven support layer; and
   (c) a protective surface pattern bonded to the expanded porous PTFE membrane layer, whereby the protective surface pattern covers 60% or less of the surface area of the membrane,
   said filter media having an air permeability of at least 1 cfm/ft$^2$.

2. The filter media of claim 1, wherein the non-woven support layer is selected from a spunbond and a melt blown polyester.

3. The filter media of claim 1, wherein the protective surface pattern comprises a material selected from the group consisting of polypropylene, polyethylene, polyurethane, nylon, stainless steel, aluminum and fiberglass.

4. The filter media of claim 3, wherein the protective surface pattern comprises polypropylene.

5. The filter media of claim 1, wherein said protective surface pattern is continuous.

6. The filter media of claim 1, wherein said protective surface pattern is discontinuous.

7. The filter media of claim 1, wherein the protective surface pattern comprises a screen.

8. The filter media of claim 1, wherein the protective surface pattern comprises dots.

9. The filter media of claim 1, wherein the protective surface pattern covers 50% or less of the surface area of the membrane.

10. The filter media of claim 1, wherein said filter media has an air permeability of at least 2 cfm/ft$^2$.

11. The filter media of claim 1, wherein said filter media has an air permeability of at least 4 cfm/ft$^2$.

12. The filter media of claim 1, wherein said filter media has an air permeability of at least 7 cfm/ft$^2$.

13. The filter media of claim 1, wherein the filter media is pleated.

14. The filter media of claim 1, wherein the protective surface pattern comprises a screen laminated to the membrane with a thermoplastic adhesive.

15. The filter media of claim 1 in the form of a filter cartridge.

16. The filter media of claim 1 in the form of a filter cloth.

17. The filter media of claim 1 in the form of a filter bag.

18. The filter media of claim 1, wherein said filter media has a particle collection efficiency of at least 80%.

19. The filter media of claim 1, wherein said filter media further has a permeability recovery of at least 50%.

20. The filter media of claim 1, wherein said filter media as a permeability recovery of at least 70%.

21. A filter media comprising:
    (d) a non-woven support layer;
    (e) an expanded porous PTFE membrane layer bonded to the non-woven support layer; and
    (f) a protective surface pattern comprising dots bonded to the expanded porous PTFE membrane layer, whereby the protective surface pattern covers 60% or less of the surface area of the membrane,
        said filter media having an air permeability of at least 1 cfm/ft$^2$.

22. The filter media of claim 21, wherein the non-woven support layer is selected from a spunbond and a melt blown polyesters.

23. The filter media of claim 21, wherein the protective surface pattern comprises a material selected from the group consisting of polypropylene, polyethylene, polyurethane, nylon, stainless steel, aluminum and fiberglass.

24. The filter media of claim 23, wherein the protective surface pattern comprises polypropylene.

25. The filter media of claim 21, wherein the protective surface pattern covers 50% or less of the surface area of the membrane.

26. The filter media of claim 21, wherein said filter media has an air permeability of at least 2 cfm/ft$^2$.

27. The filter media of claim 21, wherein said filter media has an air permeability of at least 4 cfm/ft$^2$.

28. The filter media of claim 21, wherein said filter media has an air permeability of at least 7 cfm/ft$^2$.

29. The filter media of claim 21, wherein the filter media is pleated.

30. The filter media of claim 21 in the form of a filter cartridge.

31. The filter media of claim 21 in the form of a filter cloth.

32. The filter media of claim 21 in the form of a filter bag.

33. A filter media comprising:
    a non-woven polyester support layer;
    an expanded porous PTFE membrane laminated to the non-woven support layer; and
    a screen material having intersecting filaments laminated to the expanded porous PTFE, whereby the screen material covers 50% or less of the surface area of the membrane
        said filter media having an air permeability of at least 1 cfm/ft$^2$.

34. The filter media of claim 33, wherein the non-woven support layer is selected from a spunbond and a melt blown polyester.

35. The filter media of claim 33, wherein the screen material comprises a material selected from the group consisting of polypropylene, polyethylene, polyurethane, nylon, stainless steel, aluminum and fiberglass.

36. The filter media of claim 33, wherein the screen material comprises polypropylene.

37. The filter media of claim 33, wherein said filter media has an air permiability of at least 2 cfm/ft$^2$.

38. The filter media of claim 33, wherein said filter media has an air permeability of at least 4 cfm/ft$^2$.

39. The filter media of claim 33, wherein said filter media has an air permeability of at least 7 cfm/ft$^2$.

40. The filter media of claim 33, wherein the filter media is pleated.

41. The filter media of claim 33, wherein the screen material comprises a screen laminated to the membrane with a thermoplastic adhesive.

42. The filter media of claim 33 in the form of a filter cartridge.

43. The filter media of claim 33 in the form of a filter cloth.

44. The filter media of claim 33 in the form of a filter bag.

45. A filter media comprising:
    a non-woven support layer;
    an expanded porous PTFE membrane layer bonded to the non-woven support layer; and
    means for protecting the expanded PTFE membrane layer against damage due to impingement of collected particles,
        said filter media having an air permeability of at least 1 Frazier.

46. The filter media of claim 45, wherein said means comprises a screen.

47. The filter media of claim 45, wherein said means comprises dots.

* * * * *